(12) United States Patent
Park et al.

(10) Patent No.: US 10,596,960 B2
(45) Date of Patent: Mar. 24, 2020

(54) TRANSPARENT MEMBER FOR AUTOMOBILE INTERIOR PARTS

(71) Applicants: HYUNDAI MOBIS CO., LTD., Seoul (KR); DAEWON CHEMICAL CO., LTD., Osan-si, Gyeonggi-do (KR)

(72) Inventors: Sang Phil Park, Anyang-si (KR); Hyeon Don Kim, Yongin-si (KR); Jung Hwan Lee, Yongin-si (KR); Young Kyu Rhim, Hwaseong-si (KR); Mi Jeong Jeon, Gwangju-si (KR)

(73) Assignees: HYUDAI MOBIS CO., LTD., Seoul (KR); DAEWON CHEMICAL CO., LTD., Osan-si, Gyeonggi-do (KR)

( * ) Notice: Subject to any disclaimer, the term of this patent is extended or adjusted under 35 U.S.C. 154(b) by 0 days.

(21) Appl. No.: 16/024,005

(22) Filed: Jun. 29, 2018

(65) Prior Publication Data
US 2019/0161003 A1 May 30, 2019

(30) Foreign Application Priority Data

Nov. 27, 2017 (KR) .......................... 10-2017-0159171

(51) Int. Cl.
*B60Q 3/60* (2017.01)
*B60Q 3/70* (2017.01)
*F21V 3/06* (2018.01)
*C08K 3/26* (2006.01)
*C08G 18/06* (2006.01)
(Continued)

(52) U.S. Cl.
CPC ................. *B60Q 3/60* (2017.02); *B60Q 3/70* (2017.02); *C08G 18/06* (2013.01); *C08G 18/42* (2013.01); *C08G 18/4277* (2013.01); *C08G 18/44* (2013.01); *C08G 18/48* (2013.01); *C08G 18/73* (2013.01); *C08G 18/755* (2013.01); *C08G 18/758* (2013.01); *C08G 18/7614* (2013.01); *C08G 18/7621* (2013.01); *C08G 18/7642* (2013.01); *C08G 18/7671* (2013.01); *C08G 18/771* (2013.01); *C08K 3/26* (2013.01); *F21V 3/06* (2018.02); *C08K 2003/265* (2013.01);
(Continued)

(58) Field of Classification Search
None
See application file for complete search history.

(56) References Cited

U.S. PATENT DOCUMENTS

| | | | | |
|---|---|---|---|---|
| 5,120,920 A | * | 6/1992 | Moriike | H01H 9/182 200/310 |
| 2007/0159837 A1 | * | 7/2007 | Flehinghaus | G02B 6/0041 362/459 |

(Continued)

FOREIGN PATENT DOCUMENTS

KR  10-2016-0142427 A  12/2016

*Primary Examiner* — Elmito Breval
(74) *Attorney, Agent, or Firm* — Knobbe Martens Olson & Bear LLP

(57) ABSTRACT

The present invention relates to a transparent member for an automotive interior part. In one embodiment, the transparent member for the automotive interior part includes: a light source; an optical pattern layer formed over the light source; and a first light-transmitting skin layer formed on the optical pattern layer and including about 1 part by weight to about 25 parts of a first inorganic filler dispersed in 100 parts by weight of a first transparent resin matrix, wherein the first inorganic filler includes spherical calcium carbonate ($CaCO_3$).

14 Claims, 6 Drawing Sheets

(51) Int. Cl.
    *C08G 18/42*     (2006.01)
    *C08G 18/73*     (2006.01)
    *C08G 18/76*     (2006.01)
    *C08G 18/75*     (2006.01)
    *C08G 18/77*     (2006.01)
    *C08G 18/48*     (2006.01)
    *C08G 18/44*     (2006.01)
    *F21Y 115/10*     (2016.01)

(52) U.S. Cl.
    CPC ..... *C08K 2201/005* (2013.01); *F21Y 2115/10* (2016.08)

(56) References Cited

U.S. PATENT DOCUMENTS

2010/0031544 A1* 2/2010 Hwang ............... G02B 5/02
                                                              40/564
2016/0035514 A1* 2/2016 Kweon ............... H01H 13/83
                                                               200/314

* cited by examiner

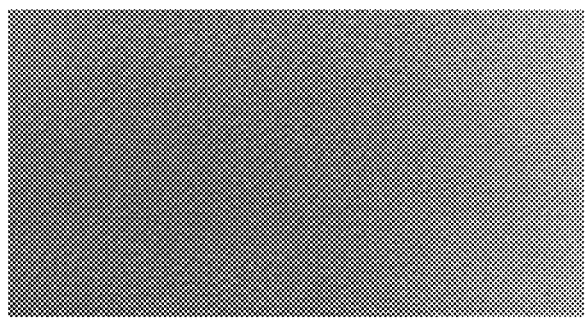 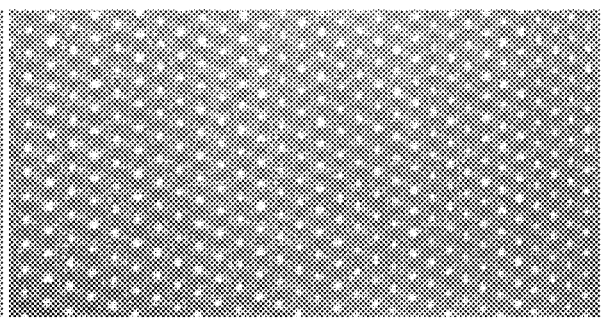
FIG. 8 (a)   FIG. 8 (b)

TRANSPARENT MEMBER FOR AUTOMOBILE INTERIOR PARTS

CROSS-REFERENCE TO RELATED APPLICATION

This application claims the benefit of Korean Patent Application No. 10-2017-0159171, filed on Nov. 27, 2017 in the Korean Intellectual Property Office, the entire disclosure of which is incorporated herein by reference.

BACKGROUND OF THE INVENTION

Field of the Invention

The present invention relates to a transparent member for an automotive interior part.

Description of the Related Art

Automotive interior parts provide comfort for passengers, and the appearance, feel and the like of the interior parts act as important factors that determine automotive perceived sensibility. These automotive interior parts include handles, instrument panels, door trims, head liners and the like. These interior parts are important factors that determine the perceived quality of automotive interiors.

In recent years, as the high quality and individuality of automobiles have been demanded, the high-quality appearance of interior parts that determine the aesthetics of automotive interiors has been demanded. Furthermore, in order to provide comfort for passengers in automobiles during running at night or in dark places, automotive interiors also include lighting lamps, instrument panels, switch lights and the like. In addition, in order to satisfy the emotions of passengers by creating a subdued atmosphere in automotive interiors, the automotive interiors may also further include mood lights in parts such as instrument panels and door trims.

Meanwhile, these automotive interior parts may be manufactured by disposing a light source in opaque injected-molded parts, coating the surface of the injection-molded parts or subjecting the injection-molded parts to surface treatment such as film insert molding, and covering the surface of the injection-molded parts with leather. Thus, these automotive interior parts are configured such that when the light is not on, the surface of the interior parts is directly exposed.

Prior art documents related to the present invention include Korean Patent Application Publication No. 2016-0142427 (published on Jun. 15, 1999; entitled: Automotive Interior Part and Manufacturing Method Thereof).

SUMMARY OF THE INVENTION

One aspect of the present invention is directed to a transparent member for an automotive interior part. In one embodiment, the transparent member for the automotive interior part includes: a light source; an optical pattern layer formed over the light source; and a first light-transmitting skin layer formed on the optical pattern layer and including about 1 part by weight to about 25 parts by weight of a first inorganic filler dispersed in 100 parts by weight of a first transparent resin matrix, wherein the first inorganic filler includes spherical calcium carbonate ($CaCO_3$).

In one embodiment, the first transparent resin matrix may include one or more of polycarbonate resin, polyethylene terephthalate (PET) resin, epoxy resin, poly(meth)acrylic resin, polyurethane resin, and triacetate cellulose (TAC) resin.

In one embodiment, the optical pattern layer may include a mesh.

In one embodiment, the optical pattern layer may include a light-shielding layer having a predetermined light-transmitting pattern formed therein.

In one embodiment, the light-transmitting pattern may be formed by laser etching or ink transfer.

In one embodiment, the first inorganic filler may have an average size of about 0.1 µm to about 100 µm.

In one embodiment, the first light-transmitting skin layer may further include one or more of pigments, dyes, light absorbers and light stabilizers.

In one embodiment, the first inorganic filler may further include a spherical light-diffusing filler, and the light-diffusing filler may include one or more of metallic, silicone and acrylic light-diffusing fillers.

In one embodiment, a predetermined shape may be formed on the upper surface or lower surface of the first light-transmitting skin layer.

In one embodiment, the transparent member may further include a second light-transmitting skin layer which is formed under the optical pattern layer and which include a second transparent resin matrix.

In one embodiment, the second light-transmitting skin layer may further include a second inorganic filler dispersed in the second transparent resin matrix, and the second inorganic filler may include spherical calcium carbonate ($CaCO_3$).

In one embodiment, the transparent member may further include a backcloth layer which is formed under the second light-transmitting layer, and an adhesive layer may be formed between the second light-transmitting skin layer and the backcloth layer.

In one embodiment, the backcloth layer may be formed to include one or more of a thermoplastic resin, a thermoplastic elastomer and an expanded foam.

In one embodiment, the backcloth layer may include one or more of fabric, mesh, nonwoven fabric and foam forms.

In one embodiment, the transparent member for the automotive interior part may be a handle, a garnish, an instrument panel, a door trim, a console or head liner.

The transparent member for the automotive interior part according to the present invention transmits light along the light-transmitting pattern when the light source is lighted, and thus the transparent member may have excellent visibility and aesthetics. In addition, it may have excellent cushioning and surface texture, excellent mechanical properties such as impact resistance and durability, and a high degree of design freedom, and show excellent process efficiency, productivity and economic efficiency.

BRIEF DESCRIPTION OF THE DRAWINGS

FIG. 8(a) is a transparent member of Example 3 of the present invention before lighting; and FIG. 8(b) is a photograph of the transparent member of Example 3 after lighting.

DETAILED DESCRIPTION OF THE INVENTION

Figure 1:
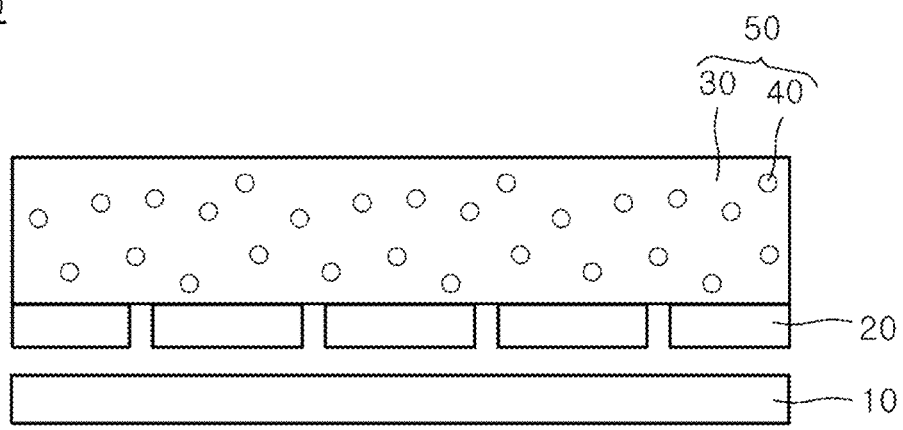
FIG. 1 shows a transparent member for an automotive interior part according to one embodiment of the present invention.

Hereinafter, exemplary embodiments of the present invention will be described in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The drawings are not necessarily to scale and in some instances, proportions may have been exaggerated in order to clearly illustrate features of the embodiments. Furthermore, although only a portion of a constituent element is also shown for convenience of explanation, any person skilled in the art will easily recognize the remaining portion of the element. Generally, the description of the drawings is made from the observer's viewpoint. When one element is referred to as being "on" or "under" another element, it not only refers to a case where the element is formed directly located "on" or "under" the other element but also a case where an additional element exists between these elements. Furthermore, any person skilled in the art will appreciate that the present invention may be embodied in various different forms without departing the technical spirit of the present invention. Throughout the drawings, the same reference numerals are used to designate substantially the same elements.

As used herein, the term "transparent" means transparency with a visible light transmittance of at least 80%.

Transparent Member for Automotive Interior Part

One aspect of the present invention is directed to a transparent member for an automotive interior part. FIG. 1 shows a transparent member for an automotive interior part according to one embodiment of the present invention. In one embodiment, the transparent member 100 for the automotive interior part includes: a light source 10; an optical pattern layer 20 formed over the light source 10; and a first light-transmitting skin layer 50 formed on the optical pattern layer 20 and including about 1 part by weight to about 25 parts by weight of a first inorganic filler 40 dispersed in 100 parts by weight of a first transparent resin matrix 30, wherein the first inorganic filler 40 includes spherical calcium carbonate ($CaCO_3$).

In an embodiment, the light source 10 may include a light-emitting diode (LED).

In one embodiment, the optical pattern layer 20 may include a light-shielding resin having a predetermined light-transmitting pattern formed therein. In one embodiment, the light-shielding resin may include a light-shielding polyurethane resin, but is not limited thereto. The light-shielding polyurethane resin may be prepared using a polyol compound, an isocyanate-based curing agent and a pigment.

When the light-shielding resin is applied, light diffusion and light transmission in portions other than the formed light-transmitting pattern can be suppressed, and a selective light-transmitting pattern may be formed by transmitted light.

In one embodiment, the light-transmitting pattern may be formed in the light-shielding resin by laser etching or ink transfer.

In one embodiment, the thickness of the optical pattern layer may be about 0.1 mm to about 5 mm. At this thickness, the light-shielding property and mechanical strength of the optical pattern layer may be ensured.

Figure 2:
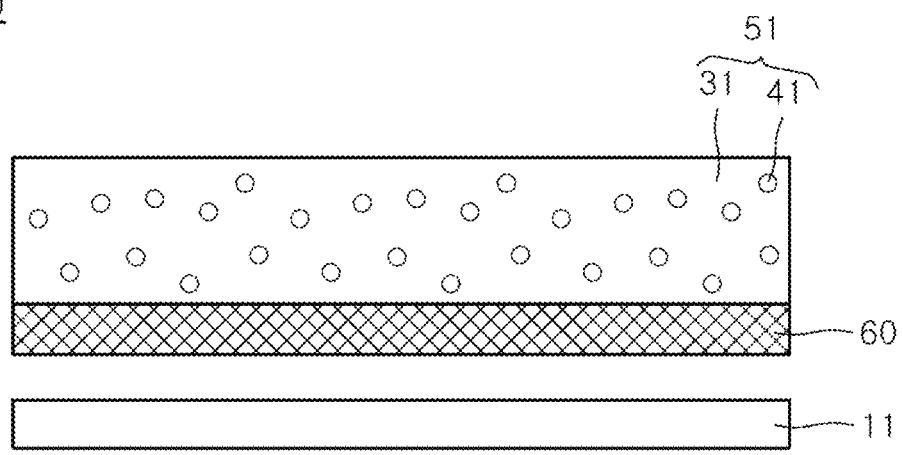
FIG. 2 shows a transparent member for an automotive interior part according to another embodiment of the present invention.

FIG. 2 shows a transparent member 200 for an automotive interior part according to another embodiment of the present invention. Referring to FIG. 2, an optical pattern layer 60 may include a mesh. When the optical pattern layer 60 is formed using the mesh, light emitted from a light source 11 may be transmitted through the mesh type optical pattern layer 60 and emitted through the front surface of a first light-transmitting skin layer 51.

In one embodiment, the first transparent resin matrix 30 may include polycarbonate resin, polyethylene terephthalate (PET) resin, epoxy resin, poly(meth)acrylic resin, polyurethane resin, and triacetate cellulose (TAC) resin. For example, it may include polyurethane resin. When the polyurethane resin is used, the transparent member may have excellent impact resistance and durability.

For example, the polyurethane resin may be prepared using a polyol compound and an isocyanate-based curing agent. The polyol compound may include one or more of polyether polyol, polyester polyol, polycaprolactone polyol, polyether ester polyol, and polycarbonate polyol.

The isocyanate-based curing agent may include one or more of phenylene diisocyanate, tolylene diisocyanate (TDI), xylylene diisocyanate, diphenyl methane diisocyanate (MDI), hexamethylene diisocyanate, trimethyl hexamethylene diisocyanate, lysine diisocyanate, isophorone diisocyanate, and dicyclohexylmethane diisocyanate.

In one embodiment, the polyol may have a weight-average molecular weight of about 400 g/mol to about 6,000 g/mol and a hydroxyl value of about 25 mg KOH/g to about 30 mg KOH/g. In these ranges, the first light-transmitting skin layer may have excellent durability and mechanical properties.

In one embodiment, the first transparent resin matrix may have a weight-average molecular weight of about 150,000 g/mol to about 200,000 g/mol. For example, the first transparent resin matrix may include a polyurethane resin having a weight-average molecular weight of about 150,000 g/mol to about 200,000 g/mol.

In one embodiment, the first light-transmitting skin layer may further include a conventional leveling agent, light stabilizer, UV absorber, filler and the like.

In one embodiment, when the light source 10 is lighted, light will be incident and transmitted through the light-transmitting pattern formed in the optical pattern layer 20, and the light displayed through the first light-transmitting skin layer 50 will have a soft and gentle feeling without dazzling, due to the optical actions (such as light diffusion and matting) of the first inorganic filler 40.

In one embodiment, the first light-transmitting skin layer may further include, based on 100 parts by weight of the first transparent resin matrix, about 0.1 parts by weight to about 50 parts by weight of one or more of pigments, dyes, light absorbers and light stabilizers. For example, it may include about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 or 50 parts by weight of one or more of pigments, dyes, light absorbers and light stabilizers.

In one embodiment, the pigments and dyes may include rare earth oxide pigments, rare earth oxide dyes, titanium oxide, carbon black, C.I. Pigments, and the like. In one embodiment, the first light-transmitting skin layer may have a thickness of about 0.1 mm to about 5 mm. At this thickness, the first light-transmitting skin layer may have excellent adhesion and mechanical strength while the light-transmitting property thereof is not reduced.

In one embodiment, the first inorganic filler may have an average size of about 0.1 µm to about 100 µm. At this size, light incident through the light-transmitting pattern can be easily diffused and extinguished, and the first inorganic filler may have excellent dispersibility which leads to excellent miscibility and productivity. For example, the size may be about 0.1 µm to about 50 µm. For example, the size may be about 20 µm to about 40 µm. For example, the size may be about 30 µm to about 40 µm.

The first inorganic filler has a spherical shape. When the first inorganic filler has this shape, it may have excellent matting and light diffusion effects.

In one embodiment, the first light-transmitting skin layer includes, based on 100 parts by weight of the first transparent resin matrix, about 1 to about 25 parts by weight of the first inorganic filler. If the first inorganic filler is included in an amount of less than about 1 part by weight, the light diffusion and light dispersion effects of the first inorganic filler will be insignificant, and if the first inorganic filler is included in an amount of more than about 25 parts by weight, the mechanical properties of the transparent member of the present invention may be reduced. For example, the first inorganic filler may be included in an amount of about 1, 2, 3, 4, 5, 6, 7, 8, 9, 10, 11, 12, 13, 14, 15, 16, 17, 18, 19, 20, 21, 22, 23, 24 or 25 parts by weight.

In one embodiment, the first organic filler may further include, in addition to the calcium carbonate, a spherical light-diffusing filler. In one embodiment, the spherical light-diffusing filler may include one or more of metallic, silicone and acrylic light-diffusing fillers. When the first organic filler further includes the spherical light-diffusing filler, it can show an excellent texture so that the visibility and aesthetics thereof can further be improved.

In one embodiment, the first inorganic filler may include the light-diffusing filler and the calcium carbonate at a weight ratio of about 1:2 to about 1:5. When the first inorganic filler may include the light-diffusing filler and the calcium carbonate at this weight ratio, it may have excellent visibility and aesthetics.

Figure 3:
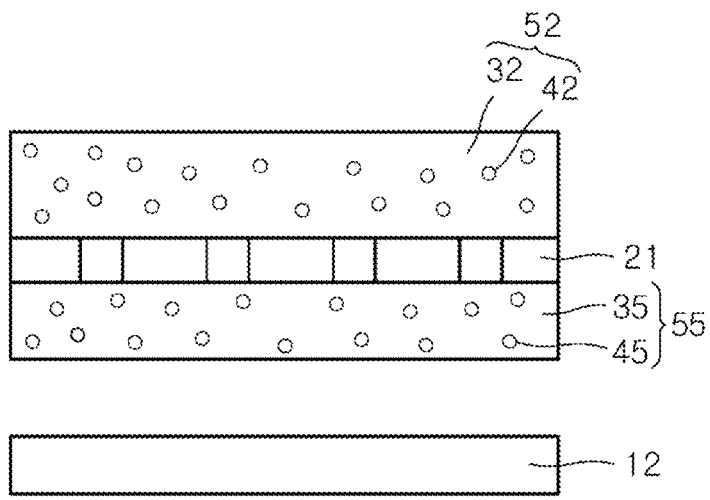
FIG. 3 shows a transparent member for an automotive interior part according to still another embodiment of the present invention.

FIG. 3 shows a transparent member 300 for an automotive interior part according to still another embodiment of the present invention. Referring to FIG. 3, under an optical pattern layer 21 of the transparent member 300, a second light-transmitting skin layer 55 including a second transparent resin matrix 35 may further be formed. The second light-transmitting skin layer that is used in the present invention may be the same as the above-described first light-transmitting skin layer.

In one embodiment, the second light-transmitting skin layer may include one or more of pigments, dyes, light absorbers and light stabilizers.

In one embodiment, the thickness of the second light-transmitting skin layer may be about 0.1 mm to about 5 mm. At this thickness, the second light-transmitting skin layer may have excellent adhesion and mechanical strength while the light-transmitting property thereof is not reduced.

Referring to FIG. 3, the second light-transmitting skin layer 55 may further include a second inorganic filler 45 dispersed in a second transparent resin matrix 35, and the second inorganic filler may include spherical calcium carbonate ($CaCO_3$). The second inorganic filler may have an average size of about 0.1 µm to about 100 µm. For example, the average size may be about 0.1 µm to about 50 µm. For example, the average size may be about 20 µm to about 40 µm. For example, the average size may be about 30 µm to about 40 µm.

Figure 4:
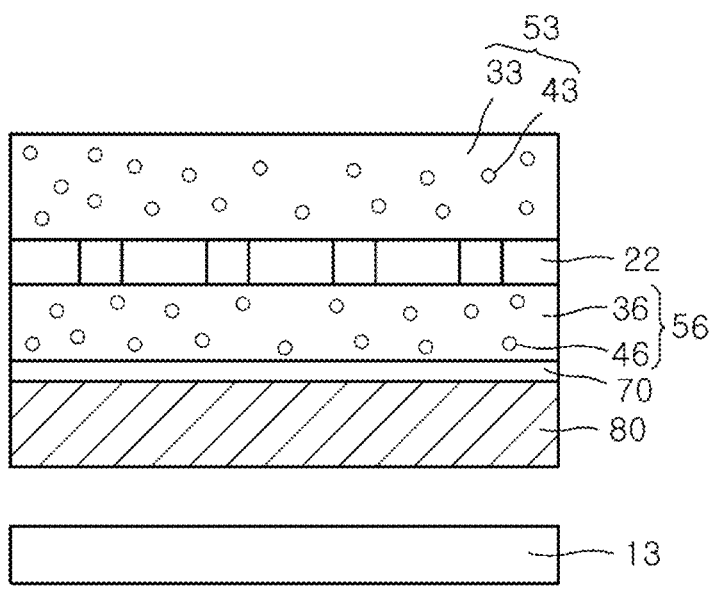
FIG. 4 shows a transparent member for an automotive interior part according to still another embodiment of the present invention.

FIG. 4 shows a transparent member 400 for an automotive interior part according to still another embodiment of the present invention. Referring to FIG. 4, the transparent member 400 may further include a backcloth layer 80 formed under a second light-transmitting skin layer 56. In one embodiment, an adhesive layer 70 may be formed between the second light-transmitting skin layer 56 and the backcloth layer 80.

In one embodiment, the adhesive layer 70 may be formed of a transparent material in order to ensure transparency. For example, it may be formed of a silicone and acrylic adhesive composition.

In one embodiment, the thickness of the adhesive layer may be about 0.01 mm to about 1 mm. At this thickness, the adhesive layer may have excellent adhesion and mechanical strength while the transparency thereof is not reduced.

In one embodiment, the backcloth layer may be formed to include one or more of a thermoplastic resin, a thermoplastic elastomer and an expanded foam. In one embodiment, the backcloth layer may include one or more of fabric, mesh, nonwoven fabric and foam forms.

In one embodiment, the thickness of the backcloth layer may be about 0.1 mm to about 50 mm. At this thickness, the transparent member of the present invention may have excellent aesthetics while the transparency thereof is not significantly reduced.

Figure 7:
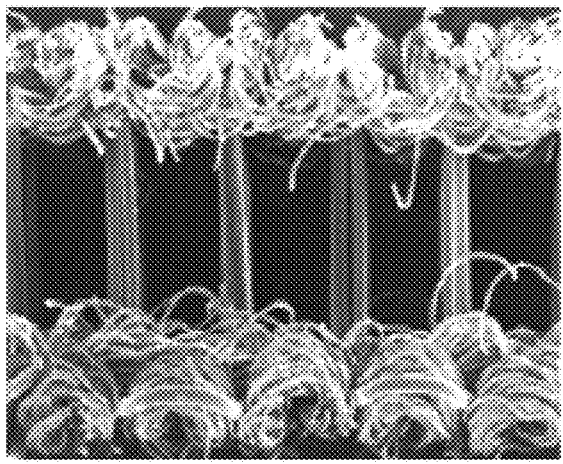
FIGS. 7(a) to 7(d) are optical microscope photographs of a backcloth layer according to one embodiment of the present invention.
Figure 7:
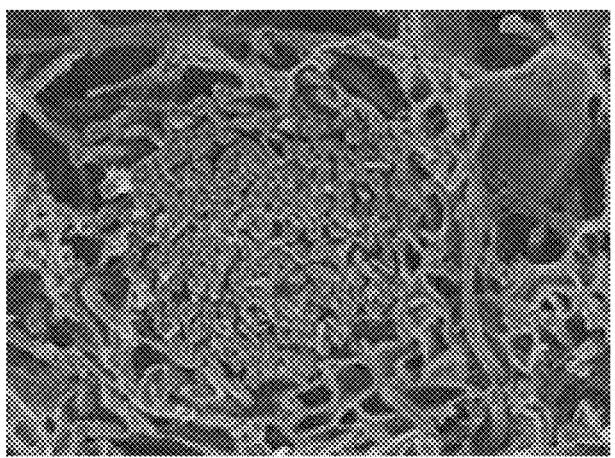
Figure 7:
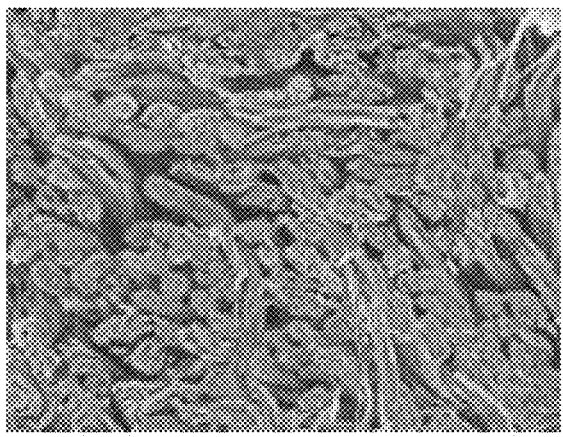
Figure 7:
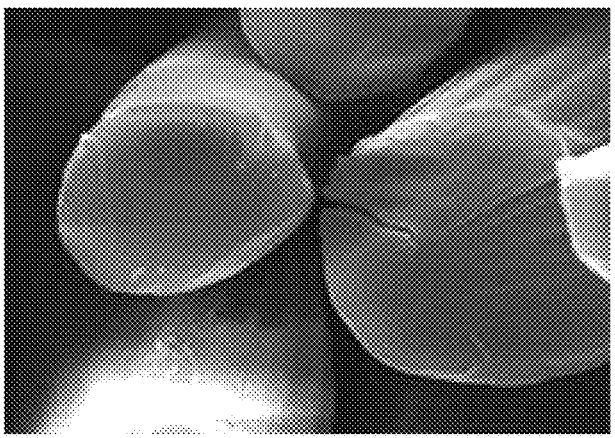

FIGS. 7(a) to 7(d) are optical microscope photographs of a backcloth layer according to one embodiment of the present invention. Referring to FIG. 7, the backcloth layer may include a porous fabric. For example, the backcloth layer may include an air-cell fabric as shown in FIG. 7(a), a texture fabric as shown in FIG. 7(b), a microfiber fabric as shown in FIG. 7(c), or a split yarn fabric as shown in FIG. 7(d).

In another embodiment, the backcloth layer that is used in the present invention may be one obtained by impregnating the porous fabric with a thermoplastic resin and a thermoplastic elastomer. In this case, the backcloth layer may have improved elongation and elasticity so that it can also be used as a sheet material.

Figure 5:
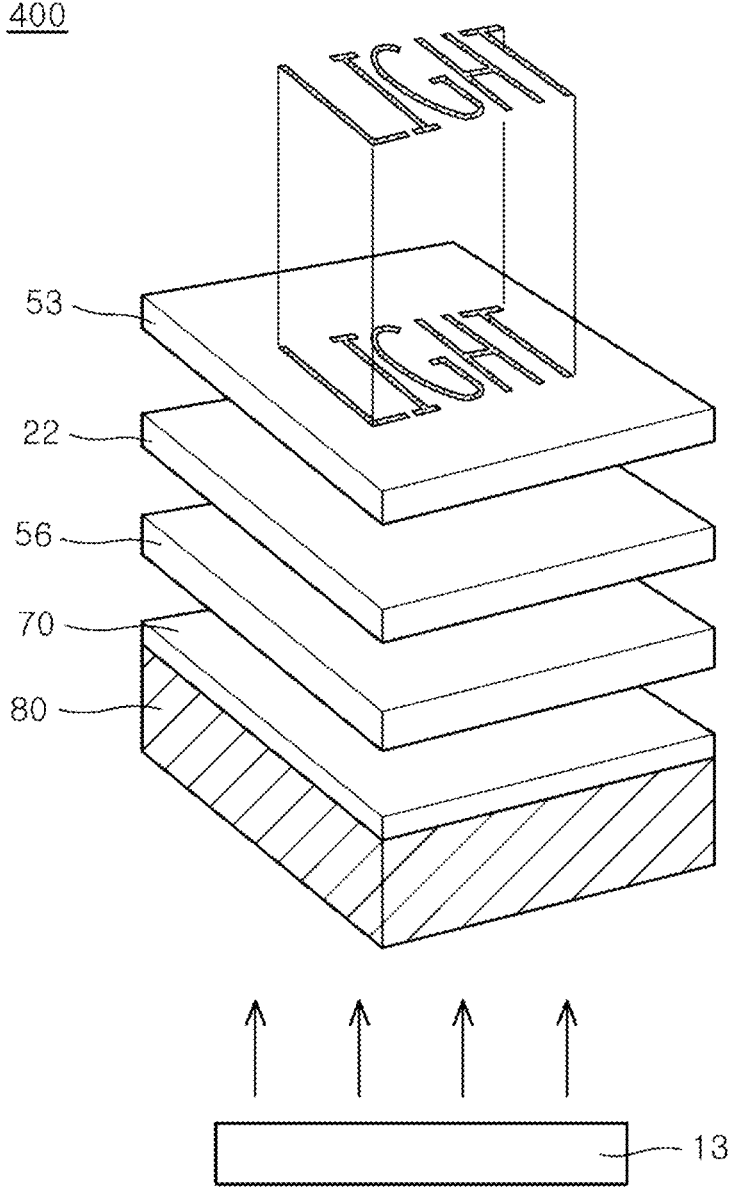
FIG. 5 shows a transparent member for an automotive interior part according to still another embodiment of the present invention.
Figure 6:
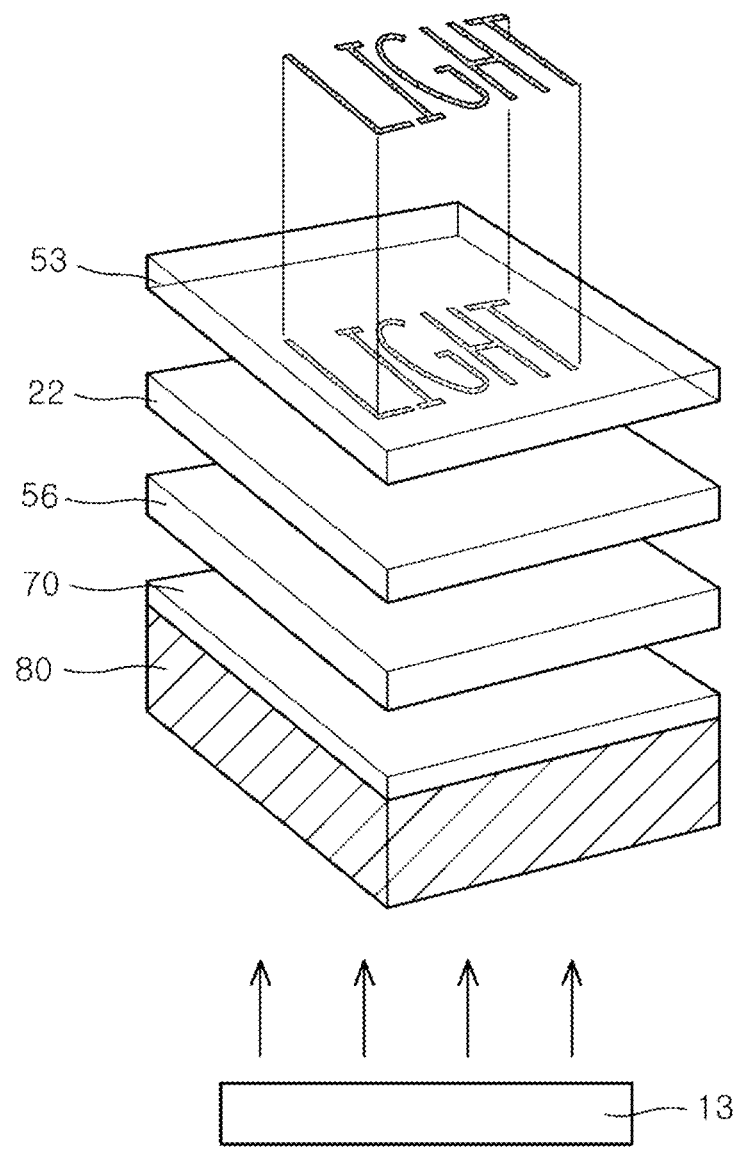
FIG. 6 shows a transparent member for an automotive interior part according to yet another embodiment of the present invention.

FIG. 5 shows a transparent member for an automotive interior part according to still another embodiment of the present invention, and FIG. 6 shows a transparent member for an automotive interior part according to yet another embodiment of the present invention. Referring to FIGS. 5 and 6, a predetermined positive or negative shape may be formed on the upper surface or lower surface of the first light-transmitting skin layer 53, so that the visibility and aesthetics of the transparent member of the present invention can further be improved.

In one embodiment, the transparent member 100 may further include a color skin layer covering at least a portion of the transparent member 100 and having formed therein a pattern corresponding to the light-transmitting pattern.

In one embodiment, the transparent member for the automotive interior part may be a handle, a garnish, an instrument panel, a door trim, a console or a head liner.

In one embodiment, the use of the transparent member can provide mood lighting or information display function such as a driver risk signal, thereby maximizing comfort for passengers and increasing accident prevention and safety.

The transparent member for the automotive interior part according to the present invention transmits light along the light-transmitting pattern when the light source is lighted, and thus the transparent member may have excellent visibility and aesthetics. Furthermore, it may have excellent cushioning and surface texture, excellent mechanical properties such as impact resistance and durability, and a high degree of design freedom. In addition, it can reduce the number of process stages in subsequent interior part manufacturing processes such as a leather covering process, and thus may show excellent process efficiency, productivity and economic efficiency.

Hereinafter, preferred examples of the present invention will be described in further detail. It is to be understood, however, that these examples are for illustrative purposes only and are not intended to limit the scope of the present invention in any way.

Example 1

A 0.1 mm-thick optical pattern layer, which includes a light-shielding polyurethane resin having a predetermined light-transmitting pattern formed by laser etching, was disposed over an LED light source. On the optical pattern layer, a 1 mm-thick first light-transmitting skin layer, which includes 1 to 25 parts by weight of a spherical first filler (including calcium carbonate ($CaCO_3$) and having an average particle size of 30 μm) dispersed in 100 parts by weight of a transparent polyurethane resin matrix, was disposed. Then, the optical pattern layer and the first light-transmitting skin layer were compressed, thereby forming a transparent member for an automotive interior part.

Example 2

A transparent member for an automotive interior part was formed in the same manner as described in Example 1 above, except that a 0.5 mm-thick optical pattern layer including a mesh was applied.

Example 3

A 0.1 mm-thick optical pattern layer, which includes a light-shielding polyurethane resin having a predetermined light-transmitting pattern formed by laser etching, was prepared. On the optical pattern layer, a 1 mm-thick light-transmitting skin layer, which includes 1 to 25 parts by weight of a spherical first inorganic filler (including calcium carbonate ($CaCO_3$) and having an average particle size of 30 μm) dispersed in 100 parts by weight of a transparent polyurethane resin matrix, was disposed. Then, a 1 mm-thick second light-transmitting skin layer, which includes 1 to 25 parts by weight of a spherical second inorganic filler (including calcium carbonate ($CaCO_3$) and having an average particle size of 30 μm) dispersed in 100 parts by weight of a transparent polyurethane resin matrix, was disposed under the optical pattern layer. The first light-transmitting skin layer, the optical pattern layer and the second light-transmitting skin layer were compressed. Then, an acrylic adhesive was applied to the lower surface of the second light-transmitting skin layer, thereby forming a 0.05 mm-thick adhesive layer. Under the adhesive layer, a 1 mm-thick backcloth layer was disposed. Thereafter, an LED light source was disposed under the backcloth layer, thereby forming a transparent member for an automotive interior part.

FIG. 8(a) is a photograph of the transparent member of Example 3 according to the present invention before lighting; and FIG. 8(b) is a photograph of the transparent member of Example 3 after lighting. Referring to FIG. 8, It can be seen that, before lighting of the light source, the optical pattern is not exposed, but after lighting of the light source, a selective light-transmitting pattern is formed by light transmitted through the predetermined light-transmitting pattern formed in the optical pattern layer.

Although the preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:
1. A transparent member for an automotive interior part, comprising:
   a light source;
   an optical pattern layer formed over the light source; and
   a first light-transmitting skin layer formed on the optical pattern layer and comprising a first transparent resin matrix and about 1 part by weight to about 25 parts by weight of a first inorganic filler dispersed in 100 parts by weight of the first transparent resin matrix,
   wherein the first inorganic filler comprises spherical calcium carbonate ($CaCO_3$),
   wherein the optical pattern layer comprises a light-shielding resin having a predetermined light-transmitting pattern formed therein.
2. The transparent member of claim 1, wherein the first transparent resin matrix comprises one or more of polycarbonate resin, polyethylene terephthalate (PET) resin, poly(meth)acrylic resin, epoxy resin, polyurethane resin, and triacetate cellulose (TAC) resin.
3. The transparent member of claim 1, wherein the optical pattern layer comprises a mesh.
4. The transparent member of claim 1, wherein the predetermined light-transmitting pattern is formed by laser printing or ink transfer.
5. The transparent member of claim 1, wherein the first inorganic filler has an average size of about 0.1 μm to about 100 μm.
6. The transparent member of claim 1, wherein the first light-transmitting skin layer comprises one or more of pigments, dyes, light absorbers and light stabilizers.
7. The transparent member of claim 1, wherein the first inorganic filler further comprises a spherical light-diffusing filler, wherein the light-diffusing filler comprises one or more of metallic, silicone and acrylic light-diffusing fillers.
8. The transparent member of claim 1, wherein a predetermined shape is formed on an upper surface or lower surface of the first light-transmitting skin layer.

9. The transparent member of claim 1, further comprising a second light-transmitting skin layer which is formed under the optical pattern layer and which comprises a second transparent resin matrix.

10. The transparent member of claim 9, wherein the second light-transmitting skin layer comprises a second inorganic filler dispersed in the second transparent resin matrix,
wherein the second inorganic filler comprises spherical calcium carbonate ($CaCO_3$).

11. The transparent member of claim 1, wherein the transparent member is a handle, a garnish, an instrument panel, a door trim, a console or a head liner.

12. A transparent member for an automotive interior part, comprising:
a light source;
an optical pattern layer formed over the light source;
a first light-transmitting skin layer formed on the optical pattern layer and comprising a first transparent resin matrix and about 1 part by weight to about 25 parts by weight of a first inorganic filler dispersed in 100 parts by weight of the first transparent resin matrix, wherein the first inorganic filler comprises spherical calcium carbonate ($CaCO_3$);
a second light-transmitting skin layer formed under the optical pattern layer and comprising a second transparent resin matrix, wherein the second light-transmitting skin layer comprises a second inorganic filler dispersed in the second transparent resin matrix, wherein the second inorganic filler comprises spherical calcium carbonate ($CaCO_3$); and
a backcloth layer formed under the second light-transmitting skin layer,
wherein an adhesive layer is formed between the second light-transmitting skin layer and the backcloth layer.

13. The transparent member of claim 12, wherein the backcloth layer comprises one or more of a thermoplastic resin, a thermoplastic elastomer and an expanded foam.

14. The transparent member of claim 12, wherein the backcloth layer comprises one or more of fabric, mesh, nonwoven fabric and foam forms.

* * * * *